United States Patent
Åström

(10) Patent No.: US 12,382,941 B2
(45) Date of Patent: Aug. 12, 2025

(54) FISHING LURE

(71) Applicant: Moldys AB, Oskarshamn (SE)

(72) Inventor: Malte Åström, Lund (SE)

(73) Assignee: Moldys AB, Oskarshamn (SE)

( * ) Notice: Subject to any disclaimer, the term of this patent is extended or adjusted under 35 U.S.C. 154(b) by 0 days.

(21) Appl. No.: 18/670,994

(22) Filed: May 22, 2024

(65) Prior Publication Data

US 2024/0306621 A1    Sep. 19, 2024

Related U.S. Application Data

(62) Division of application No. 17/702,947, filed on Mar. 24, 2022, now abandoned.

(51) Int. Cl.
*A01K 85/00* (2006.01)

(52) U.S. Cl.
CPC ...... *A01K 85/1881* (2022.02); *A01K 85/1831* (2022.02)

(58) Field of Classification Search
CPC ............ A01K 85/1881; A01K 85/1831; A01K 85/1883; A01K 85/1871; A01K 85/1821; A01K 85/1823; A01K 85/12; A01K 85/1847; A01K 85/1851; A01K 85/18; A01K 85/00; A01K 83/00
USPC ........... 43/42.18, 42.16, 42.11, 42.24, 42.28, 43/12.37, 42.38, 42.19, 42.2, 42.35, 43/42.36, 43.16, 44.83
See application file for complete search history.

(56) References Cited

U.S. PATENT DOCUMENTS

| | | | |
|---|---|---|---|
| 2,478,801 A | 8/1949 | Yungel | |
| 2,800,740 A | 7/1957 | Glaze | |
| 3,755,952 A | 9/1973 | Oliphant | |
| 3,765,117 A | 10/1973 | Gibson, Sr. | |
| 3,815,274 A | 6/1974 | Schleif | |
| 3,879,882 A | 4/1975 | Rask | |
| 4,307,531 A | 12/1981 | Honse | |
| 4,674,225 A | 6/1987 | Webb | |
| 4,703,579 A | 11/1987 | Kay | |
| 4,803,798 A | 2/1989 | Hannah | |
| 5,000,710 A | 3/1991 | Bedortha et al. | |
| D320,059 S | 9/1991 | Bedortha et al. | |
| 5,094,026 A | 3/1992 | Correll et al. | |
| 5,309,665 A | 5/1994 | Franciskovich | |
| D348,917 S | 7/1994 | Bedortha et al. | |
| 5,560,141 A | 10/1996 | Hodgin | |
| 7,059,080 B2 | 6/2006 | Bendel | |
| 7,080,476 B2 | 7/2006 | King | |
| 8,079,173 B2 * | 12/2011 | Corbitt, III | A01K 85/00 43/42.31 |
| 8,381,429 B2 | 2/2013 | Greene et al. | |

(Continued)

FOREIGN PATENT DOCUMENTS

WO    WO2016177707 A1    11/2016

*Primary Examiner* — Monica L Perry
*Assistant Examiner* — Maria E Graber
(74) *Attorney, Agent, or Firm* — Reising Ethington P.C.

(57) ABSTRACT

A fish tail fin connectable to a trailing hook of a lure, wherein the fish tail fin has a body, which has a first end directed towards a main body of the lure when connected to the lure, an opposite distal end, a longitudinal axis defined therebetween, an upper tail side and a lower tail side, said upper tail side and lower tail side diverging from each other towards the distal end, wherein the fish tail fin is configured to have a buoyancy.

21 Claims, 7 Drawing Sheets

(56) References Cited

U.S. PATENT DOCUMENTS

| | | |
|---|---|---|
| 8,402,686 B1 | 3/2013 | Osburn, III |
| 8,434,258 B2 | 5/2013 | Greene et al. |
| 8,898,951 B2 | 12/2014 | Hughes |
| 8,943,738 B2 | 2/2015 | Parcell |
| 9,060,499 B2 | 6/2015 | Roberts et al. |
| 2006/0005459 A1 | 1/2006 | Lehman |
| 2006/0042148 A1 | 3/2006 | Bendel |
| 2006/0053680 A1 | 3/2006 | Petitjean |
| 2006/0112607 A1 | 6/2006 | Snyder |
| 2006/0112608 A1 | 6/2006 | Snyder |
| 2006/0156613 A1 | 7/2006 | Sims |
| 2008/0163540 A1 | 7/2008 | Ridolfi |
| 2012/0017489 A1 | 1/2012 | Partridge |
| 2018/0125047 A1 | 5/2018 | Gierl |
| 2018/0235198 A1 | 8/2018 | Bunner |

\* cited by examiner

FISHING LURE

CROSS REFERENCE TO RELATED APPLICATIONS

This application is a divisional of U.S. patent application Ser. No. 17/702,947 filed Mar. 24, 2022. The entire content of this priority application is incorporated herein by reference in its entirety.

TECHNICAL FIELD

The present invention relates generally to fishing lures and more particularly, to a fish tail fin connectable to a trailing hook of a fishing lure.

BACKGROUND ART

Commercial and sport fishing is a rapidly growing market. A wide variety of different baits and artificial lures are available depending on the desired properties and target fish.

When dragged through a water body, lures need to be able to replicate the movements of a fish or other bait in order to get a predator's attention. In order to achieve this, different solutions have been developed to fully or at least partly replicate life-like swimming movements when dragged through a water body.

One alternative is so called jointed fishing lures, where a lure is made up of at least two segmented body sections, each jointed by a movable joint. When dragged through a water body, each of the at least two segmented body sections will move independently and the lure therefore exhibits a natural S-shaped swimming action, thus replicating the strokes of a swimming fish. An example of a jointed drag fishing lure is shown in the following U.S. patent application Ser. No. 11/014,449.

Jointed fishing lures are however quite complex in design and bigger models lack a realistic fish like movement when dragged through a water body. Usually the bigger the lure, the heavier the resistance through water, thus resulting in a heavier load on the fisherman, and on the line, reel and rod.

Another proposed alternative is a skirt attached to or dragging behind a lure body. An example is shown in the following US patent application: U.S. Pat. No. 320,059 and U.S. Ser. No. 12/807,098. However, due to their light weight and structural flexibility, skirts tend to exhibit an unrealistic unstable movement when dragged through a water body. When dragged, skirts can exhibit excessive wiggle or oscillation when trailing behind a lure body, thus not giving a realistic impression to a predator fish. The skirts can also comprise a hook hidden inside the skirt assembly. If the skirt exhibits excessive wiggle or oscillation, the hook will follow, thus decreasing the probability of hooking a fish. Moreover, it is important that the hook does not rotate around its own axis when dragged through a water body, as the hook needs to be in a stable position when a fish bites, i.e. the hook needs to always point in the same direction. If the hook rotates when a fish bites, it might not get caught by the hook. A rotating and spinning hook will also fatigue the fishing wire resulting in the hook falling off. The bigger the hook, the bigger these problems are.

In order to resolve the excessive wiggle or oscillation, a common solution is to add weight to the lure, skirt, or trailing hook. This can be done in several ways, the most common alternative being attaching a weight of different size. A common solution when wanting to stabilize the flow of a hook when dragged through a water body, is to attach a weight, or keel to the flat section, i.e. the shank, of the hook. The keel stabilizes the hook and makes the hook point in a stable direction, however it adds significant drag and weight to both the fishing line and on the fisherman.

Pelagic predators have an innate hunting method, which is to bite off the prey fish's tail fin to immobilize the fish by depriving it of its ability to swim. The predator turns after the attack and swims back to eat the hopeless prey fish. When fishing for these types of fish, it is therefore important to utilize a lure that exhibits a realistic tail stroke movement when dragged through a water body. As the predator will aim to strike at the tail, it is also important that the tail section of the lure is able to withstand the forces caused by the bite of the predator.

Therefore, there is a need to provide a fishing lure comprising a hook, exhibiting a realistic tail like movement when dragged through a water body and where the hook is able to travel in a stable manner through water.

SUMMARY OF INVENTION

An object of the present invention is to provide a fishing lure that exhibits realistic fish like movement when dragged through a water body.

It is a further object of the present invention to provide a fishing lure, that better resembles the appearance of a fish, especially when dragged through a water body.

It is a further object of the present invention to provide a fishing lure that exhibits a better wiggle and oscillation stability when dragged through a water body. It is a further object of the present invention to provide a fishing lure that is connectable to a trailing hook, and wherein the hook is able to flow through water in a stable manner.

It is a further object of the present invention to provide a fishing lure that exhibits less water resistance when dragged through a water body, thus reducing the force on a fishing line, fishing equipment and fisherman.

In a broader aspect, the invention relates to a fish tail fin connectable to a trailing hook of a lure, wherein the fish tail fin has a body, which has a first end directed towards a main body of the lure when connected to the lure, an opposite distal end, a longitudinal axis defined therebetween, an upper tail side and a lower tail side, said upper tail side and lower tail side diverging from each other towards the distal end, wherein the fish tail fin is configured to have a buoyancy.

A fish tail fin according to the present disclosure provides a more realistic fish like movement when dragged through a water body compared to the prior art. Without being bond to theory, it is believed that tail fin shape provides a stabilizing effect and a smaller wiggling of the fish tail fin when dragged through a water body. Thus, when connected to a lure, it provides the impression of a real like fish swimming by wiggling its tail fin.

Compared to the prior art, the present disclosure also solves the problem of excessive wiggle or oscillation by providing a fish tail fin connectable to a trailing hook of a lure, wherein the fish tail fin has a buoyancy. As the fish tail fin is connectable to a trailing hook of a lure, the gravitational weight of the hook is cancelled, or at least partly cancelled, by the buoyancy provided by the fish tail fin. As the gravitational forces are cancelled or partly cancelled by the provided buoyancy, the hook is much more stable when dragged through a water body. There is thus a synergistic effect provided by the weight of the hook and the buoyancy of the fish tail fin to achieve stable and controlled movement, which is not achieved in the prior art. This also results in the fish tail fin, and hence the hook, not rotating around its own axis and the hook does therefore always point in the same direction when dragged through a water body.

As a further benefit, excessive wiggle or oscillation of the lure is avoided, the fish tail fin provides lower drag when dragged through a water body. This is made possible by the fish tail fin stabilizing the hook, keeping it trailing behind the trailing lure tail in a narrower field of movement and in an upright or vertical position, thus reliving the lure tail from the kinetic energy the hook with its weight would normally produce every time the hook lashes out (i.e. wiggles) left and right, which results from the lure tail moving sideways back and forth. As the lure tail does not have to pick up the weight from the hook, the lure tail will now move sideways faster in a much narrower pattern, making the lure turn a smaller area of its sides against the water body, resulting in lower drag. This enables the usage of bigger lures and hooks compared to the prior art, and the use of lighter lines, reels and rods.

As a further benefit, the fish tail fin according to the present disclosure enables the usage of a bigger hook when using a lipped plug as lure. Usually, in order not to interfere with the fish like swimming movement provided by the lipped plug, small hooks are used. However, as the fish tail fin according to the present invention is able to stabilize the movement through a water body of a connected hook, due to the synergistic effects described above, it is possible to utilize a bigger hook in combination with a conventional lipped plug. This creates a more selection flexibility for both the producer and also the consumer. Furthermore, the buoyancy of the fish tail fin provides a lifting action towards the back end of the lipped plug, thus providing said lipped plug with a better angle of attack when traveling through a water body, resulting in better performance and diving.

The fish tail fin is preferably made of a soft and flexible plastic material. As the fish tail fin according to the present disclosure is connectable to a hook of a lure, it is important that the fish tail fin does not impede the bite of a fish as this would decrease the hook's efficiency, when setting the hook in a striking fish's mouth.

In one embodiment of the present disclosure, the fish tail fin is configured to have a buoyancy to make the fish tail fin float on water.

In one embodiment of the present disclosure, the fish tail fin further comprises a floating member attached to the body of the fish tail fin, wherein the fish tail fin is configured to have a buoyancy greater than the total gravity force acting on the lure to which it is connectable, thereby making the lure float on water.

In one embodiment of the present disclosure, the fish tail fin and the floating member together exhibit a buoyancy greater than the total gravity force acting on the fish tail fin, and the combined weight of the lure and the trailing hook connectable to the fish tail fin.

The floating member provides the fish tail fin with additional buoyancy. By controlling the buoyancy, the fish tail fin can be optimized for different hook sizes. In one embodiment of the present disclosure, both the body and the floating member are made of a material that is able to float on water when assessed individually.

In one embodiment of the present disclosure, the fish tail fin further comprises a hook support member attached to the body of the fish tail fin and wherein the hook support member is configured to be connectable to a trailing hook.

The hook support member ensures that the fish tail fin is properly connected to the trailing hook of the lure.

In one embodiment of the present disclosure, the hook support member comprises a hollow tube-shaped member with a longitudinal slit, wherein the hollow tube-shaped member is configured to form a cavity into which the trailing hook can be snapped. By snapped, it is meant that a hook is pushed into the hollow tube-shaped member through the longitudinal slit, thereby fastening the hook in a correct position. By fastening the hook efficiently, it is able to withstand the resulting forces when trailed through a water body, and when a fish attacks, i.e. bites, on the hook. Furthermore, as the hook is fastened through a snapping mechanism, it is removable and can be changed depending on the fishing conditions or the targeted fish type for instance.

In one embodiment of the present disclosure, the hollow tube-shaped member is made of PVC.

In one embodiment of the present disclosure, the hook support member comprises a first part having a substantially U-shaped form and is configured to receive the trailing hook, and a second part is configured to slide along the exterior part of the lateral walls of the first part in order to form a hollow cavity holding the hook in place. By such embodiment, it is possible to provide a hook support member wherein the hook can be hold in place, without the need of a snapping mechanism. As such, it is possible to fasten the hook with less force than is required by the snapping mechanism, since the user simply inserts the hook into the first part, and then slides the second part along the exterior part of the first part located beneath.

In one embodiment of the present disclosure, the floating member is interposed between at least two body parts. By such embodiment, it is possible to provide a more hydrodynamically efficient tail fin when dragged through a water body.

In one embodiment of the present disclosure, the hook support member is made of a flexible plastic material, preferably said plastic material is able to float on water. The flexible plastic material is folded to a cylindrical shaped, with the loose ends squeezed in and fastened between two body parts. The flexible plastic material thus forms a cylindrical hollow shape part with and an open end, or slit, where the hook's shank can be inserted.

In one embodiment of the present disclosure, the at least two body parts are substantially symmetrical in shape. Such an embodiment further improves the hydrodynamical efficiency of the fish tail fin, and further improves the impression of a real fish tail fin to a predator fish.

In one embodiment of the present disclosure, the distal end of the body is fork-like shaped. By such an embodiment, it is possible to better replicate the shape of certain types of fishes, thus improving the impression of a real fish tail fin to a predator fish.

In one embodiment of the present disclosure, the body has a general triangular shape, and the distal end of the body has a concave circular shape connecting said upper tail side and lower tail side. By such an embodiment, it is possible to better replicate the shape of certain types of fishes, thus improving the impression of a real fish tail fin to a predator fish.

In one embodiment of the present disclosure, the body is made of a flexible plastic material. By utilizing a flexible material, the body does not interfere and hinders a predator fish when biting on the hook.

In one embodiment of the present disclosure the floating member has a density of between 0.10-0.9 $g/cm^3$, preferably between 0.40-0.50 $g/cm^3$. The floating member can for instance be made of a porous wooden material having a density below 1 g/cm³ such as balsa or bamboo, or a porous plastic material having a density below 1 g/cm³ such as styrofoam or natural rubber. The density is selected depending on the desired hook to be attached.

BRIEF DESCRIPTION OF DRAWINGS

The invention is now described, by way of example, with reference to the accompanying drawings, in which.

DESCRIPTION OF EMBODIMENTS

Figure 1:
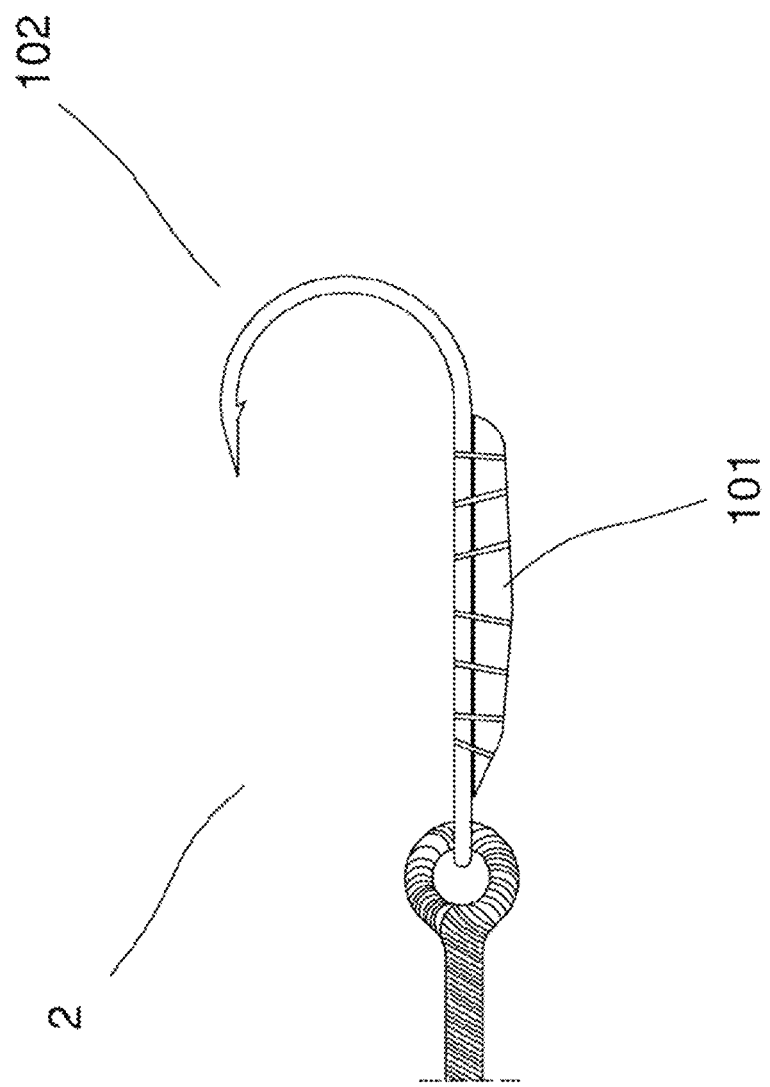
FIG. 1 is a side view of a typical weight attached to a trailing hook.

FIG. 1 is a typical example of the prior art. Referring to FIG. 1, a conventional weight (101) attachable to a trailing hook (102) according to the prior art is illustrated. The weight, or keel, stabilizes the hook and makes the hook's point, i.e. tip, travel in a direction generally parallel to the water surface. The hook itself can be connected to any conventional trailing equipment used for fishing, such as an artificial lure, skirts or any other equipment known to the skilled person. However, as previously explained, a solution such as the one illustrated in FIG. 1 adds significant drag and weight to both the fishing line and on the fisherman that uses such an equipment.

Figure 2:
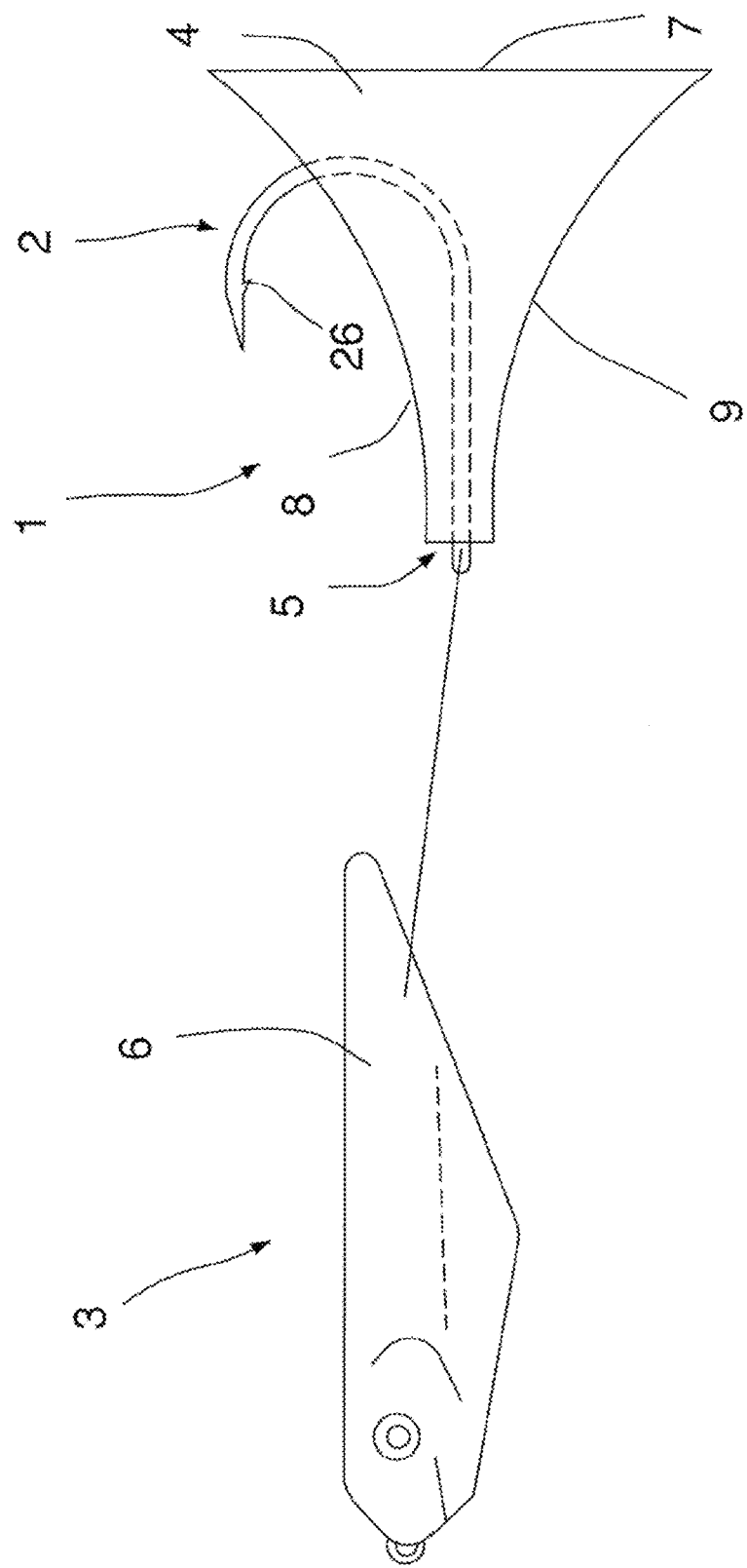
FIG. 2 is a side view to the present invention.of a fish tail fin connected to a trailing hook of a lure according

Referring now to FIG. 2 of the drawings, in an embodiment of the invention a fish tail fin 1 is preferably made of a soft and flexible plastic material, such as hollow or porous liquid silicone rubber (LSR). The fish tail fin 1 illustrated in FIG. 2 has a body 4 of a general triangular shape and is connected, via a trailing hook 2, by a fishing line to a main body 6 of a lure 3. The main body 6 of the lure 3 can exhibit different shapes and sizes. In the embodiment illustrated in FIG. 2 the lure 3 has a fish-like shape. However, the lure 3 can also be of other types known to a skilled person. The fish tail fin 1 further comprises a first end 5 directed towards the main body of the lure 3, and an opposite distal end 7. Further, the fish tail fin illustrated in FIG. 2 comprises an upper tail side 8 and a lower tail side 9, wherein said upper tail side 8 and lower tail side 9 diverges from each other towards the distal end 7, thus creating a triangular shape. The upper tail side 8 and lower tail side 9 are connected to each other by the distal end 7. In the embodiment illustrated in FIG. 2 the fish tail fin 1 is connected to the trailing hook 2 of the lure 3, and the fish tail fin according to the present invention enables a trailing hook to travel in a stable manner when dragged through water, meaning that a point 26 of the hook is directed towards the water surface, and not towards the water bottom. As has been previously explained, this is because of the synergistic effect between the hook's weight and the buoyancy provided by the fish tail fin.

Figure 3:
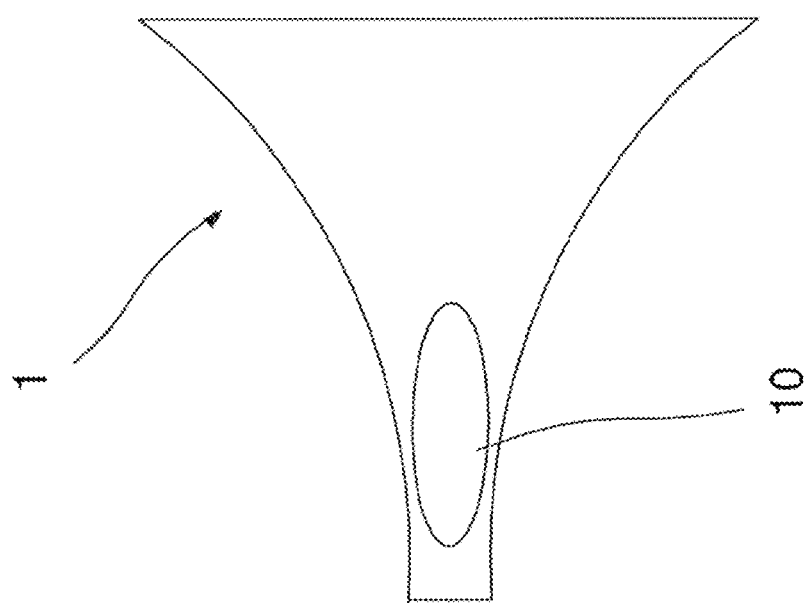
FIG. 3 is a side view of a fish tail fin according to the present invention, more particularly illustrating a fish tail fin comprising a floating member.

Referring now to FIG. 3 of the drawings, the fish tail fin 1 is illustrated with a floating member 10 attached to the body of the fish tail fin 1. The floating member 10 is configured to have a buoyancy to make the fish tail fin 1 float on water, and is preferably made of a soft plastic material. In FIG. 3 the floating member 10 is illustrated as an oval shape, but other shapes are possible as well such as square, circular, triangular etc. As illustrated in FIG. 3 the floating member 10 is located towards the first end 5 of the fish tail fin 1. However, the floating member can also be located anywhere on the body 4 of the fish tail 1.

Figure 4:
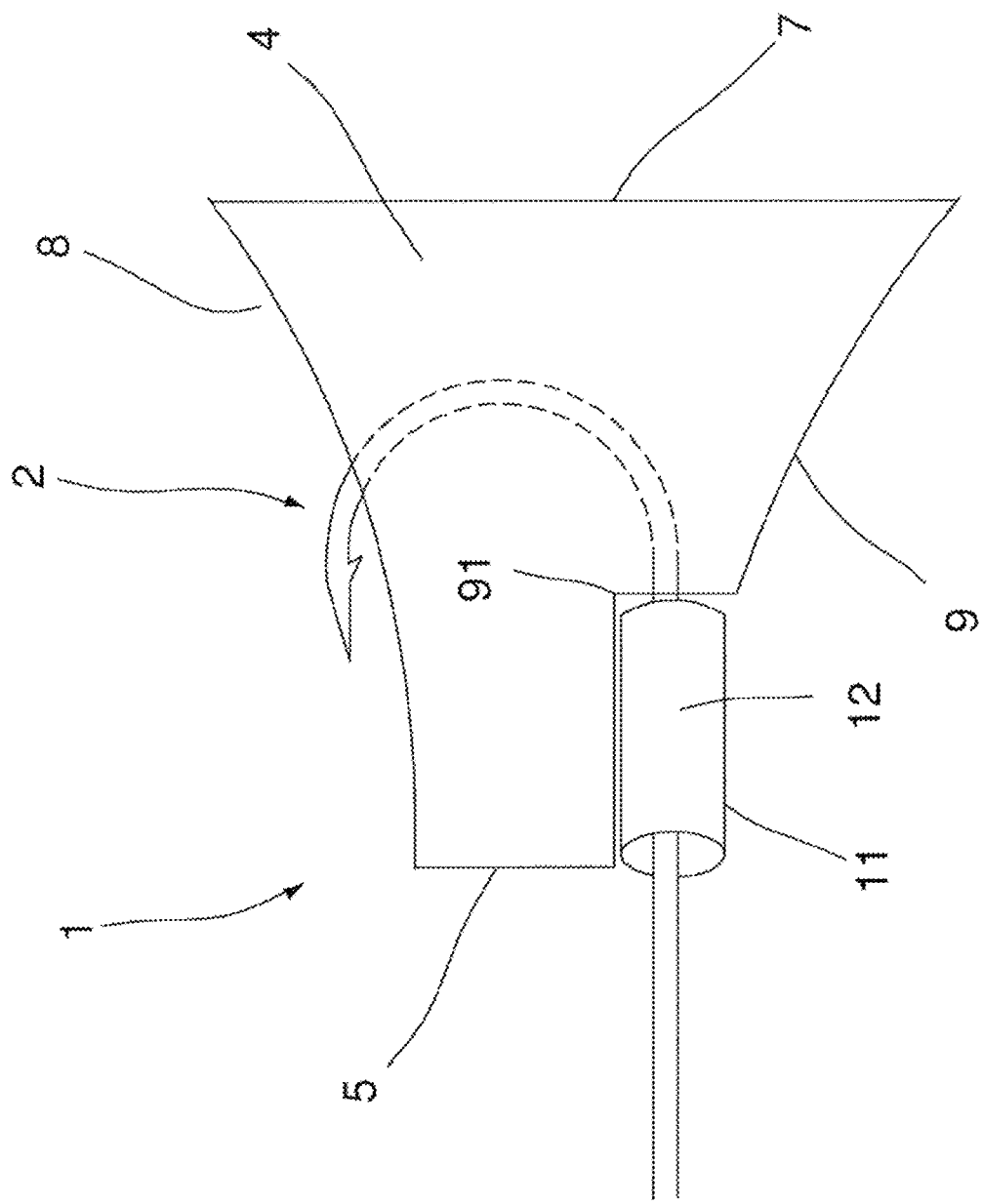
FIG. 4 is a side view of a fish tail fin according to the present invention, more particularly illustrating a fish tail fin comprising a hook support member in the form of a hollow tube, and a trailing hook.

Referring now to FIG. 4 of the drawings, the fish tail fin 1 is illustrated with a hook support member 11. As can be seen, the shank of a trailing hook 2 has been inserted in the hook support member 11 through a longitudinal slit (not shown) to hold said trailing hook 2 in place. The trailing hook 2 is attached through a fishing line to an arbitrary trailing lure 3 known to the skilled person. In FIG. 4. The hook support member 11 is placed at the lower tail side 9 of the fish tail fin 1. More precisely, the hook support member 11 is placed at an L-shaped recess 91, or substantially L-shaped recess of the lower tail side 9 directed towards the first end 5 of the fish tail fin 1.

Figure 5:
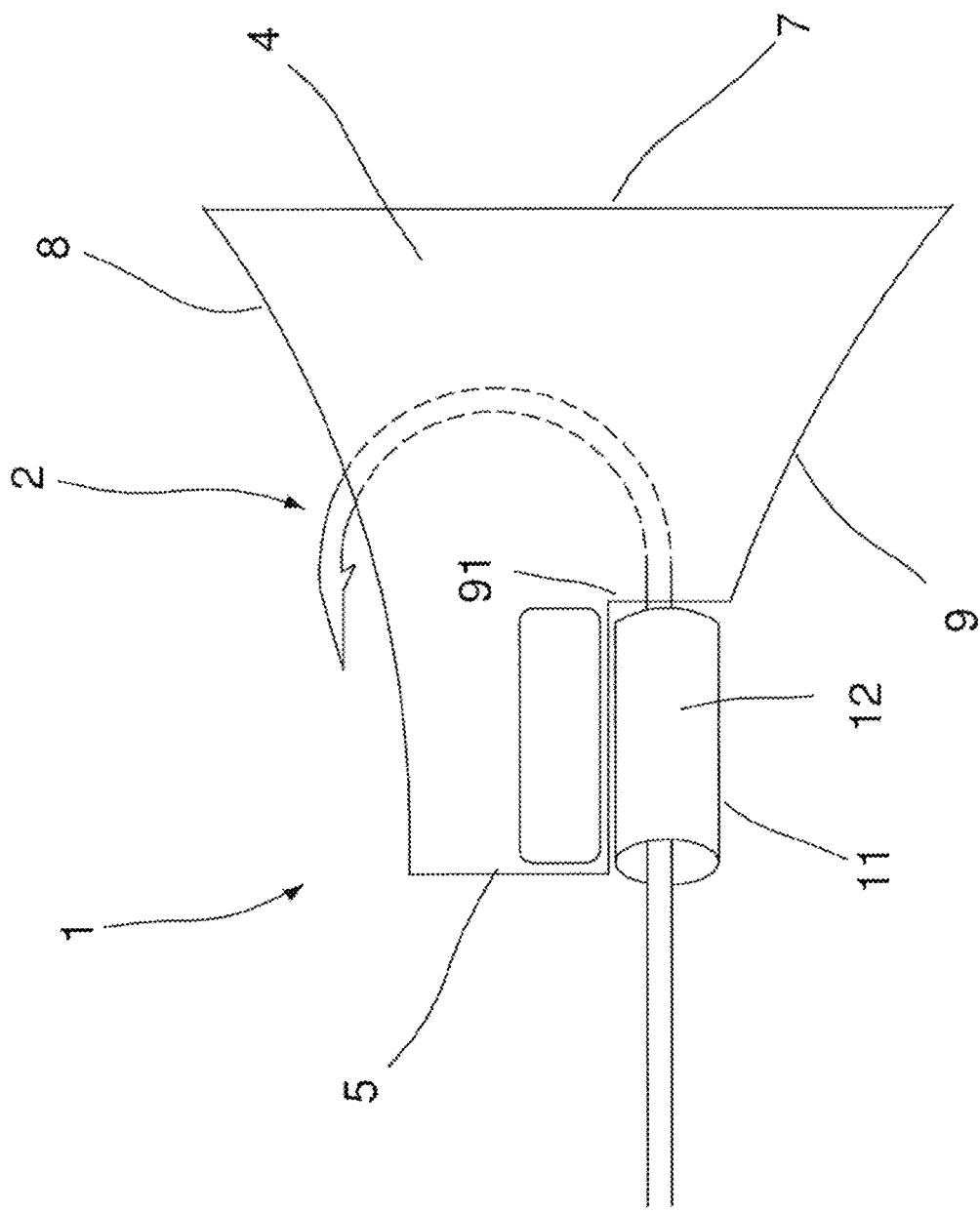
FIG. 5 is a side view of a fish tail fin according to the present invention, more particularly illustrating a fish tail fin comprising a floating member, a hook support member in the form of a hollow tube, and a trailing hook.

Referring now to FIG. 5 of the drawings, the fish tail fin 1 is illustrated with a hook support member 11 similar to the one illustrated in FIG. 4, but also comprises a floating member 10 located towards the first end 5 of the fish tail fin 1. In some embodiments of the present invention, the hook support member 11 and the floating member 10 are in communication with each other, meaning that they are in direct contact with each other.

Figure 6:
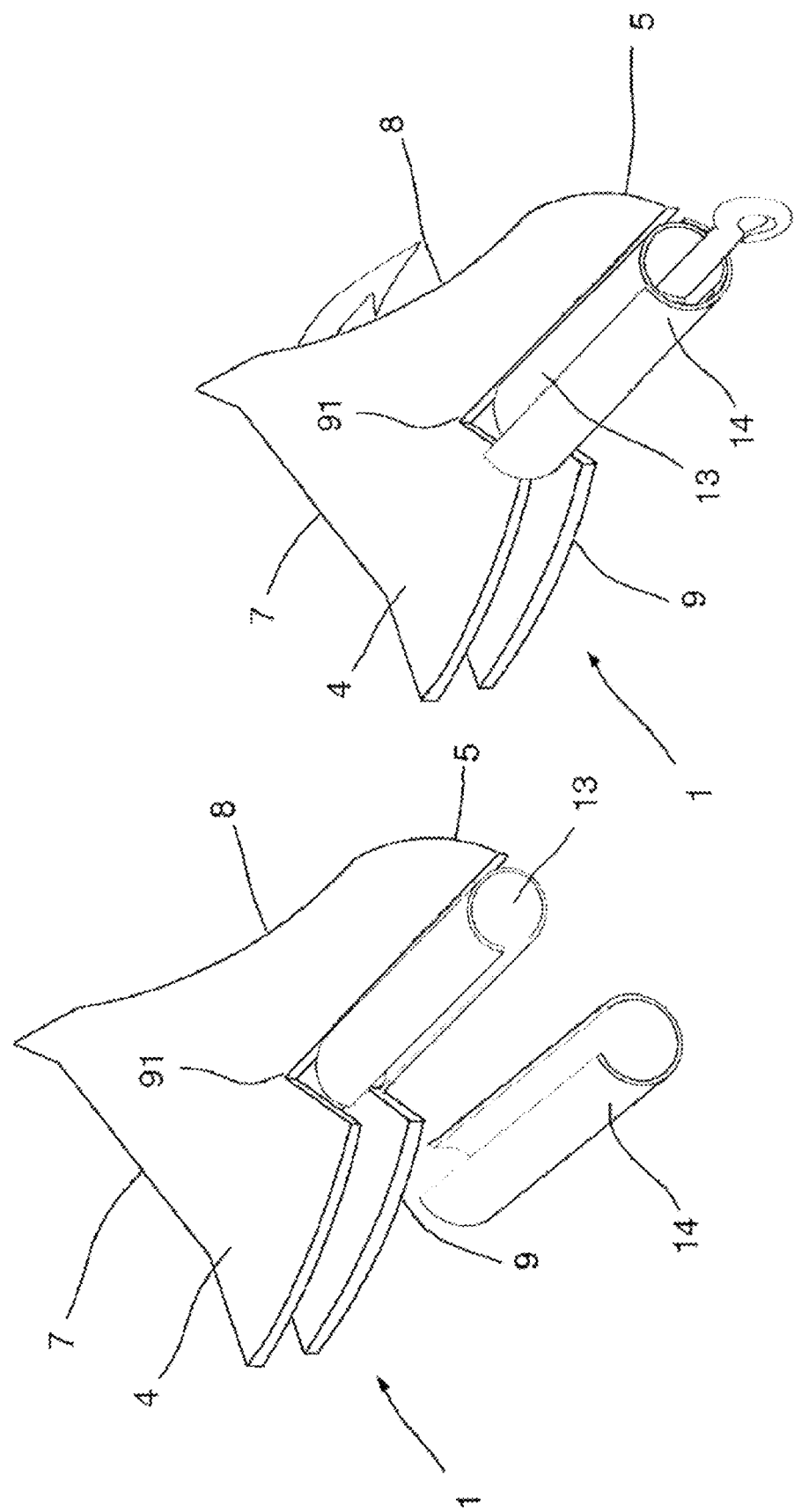
FIGS. 6a and 6b is a lateral top view of a fish tail fin according to the present invention, more particularly illustrating a fish tail fin comprising two body parts, and a slidable or pressable hook support member.

Referring now to FIGS. 6a and 6b of the drawings, the fish tail fin 1 is illustrated with another type of hook support member 11. As illustrated in FIG. 6a and FIG. 6b, the fish tail fin 1 comprises two body parts 4 substantially symmetrical in shape. Interposed between the two body parts 4, is a hook support member 11 comprising two parts forming a hollow cavity. A first part 13 of the hook support member 11 has a substantially U-shaped form and is configured to receive the shank of a trailing hook 2. A second part 14 is configured to snap on, pressed on, or slide along the exterior part of the U-shaped lateral walls of the first part 13, thus creating a hollow cavity wherein the trailing hook 2 can be held in place. Other shapes of the first 13 and second 14 parts are possible as well, such as O-shaped or square-shaped. Similarly to the embodiment illustrated in FIG. 5, the hook support member 11 comprising the first 13 and second 14 part is placed at an L-shaped recess 91, or substantially L-shaped recess of the lower tail side 9 directed towards the first end 5 of the fish tail fin 1. In FIG. 6a, the hook support member comprising a first part 13 and a second part 14 is shown in an open manner, wherein a hook shank can be inserted in the first part 13. In FIG. 6b, the second part 14.

Figure 7:
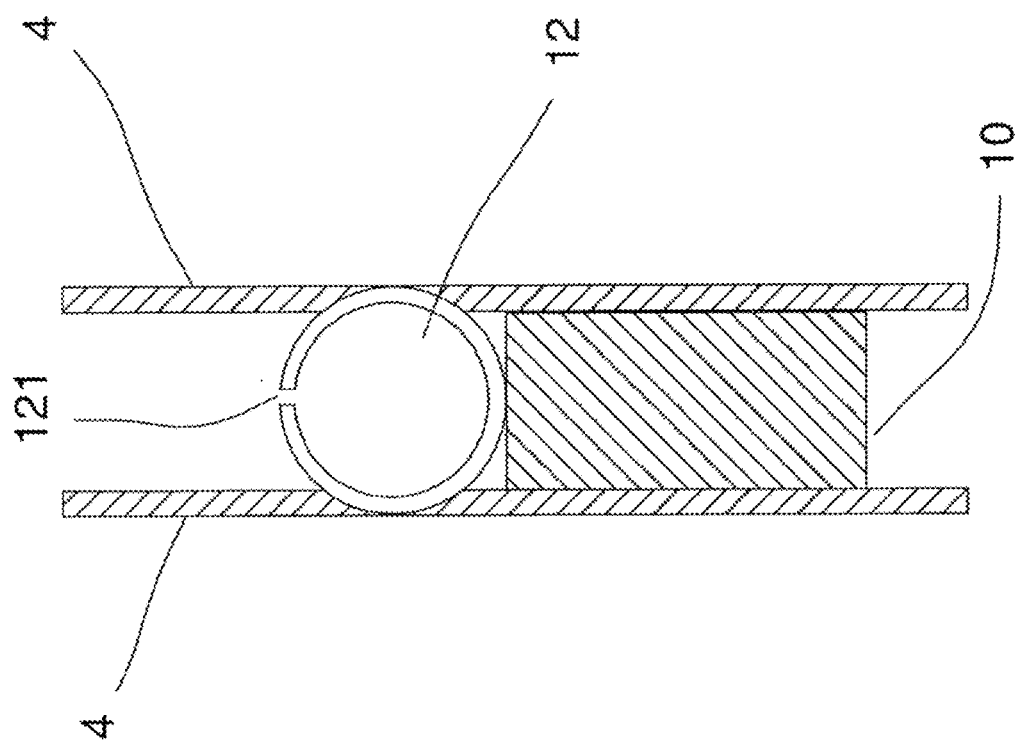
FIG. 7 is a top view of a fish tail fin according to the present invention, taken facing towards the first end of the body directed towards a main body of a lure.

Referring now to FIG. 7 of the drawings, the fish tail fin 1 is illustrated in a manner facing towards the first end 5 of the body 4 directed towards the main body 6 of a lure 3. In the embodiment illustrated in FIG. 7, the fish tail fin 1 comprises two body parts 4, and a hook support member 11 and a floating member 10 are interposed between the two body parts 4. The two body parts 4 can be substantially symmetrical in shape. Also illustrated in FIG. 7, is the longitudinal slit 121 of a hollow tube-shaped 12 hook support member 11. When a user wants to connect a trailing hook 2 of a lure 3 to the fish tail fin 1, the shank of the hook is pushed into said longitudinal slit 121 and is thus inserted into the hollow tube and kept in place. This snap type of mechanism gives the user the possibility to in an easy manner, change the type of trailing hook 2 connected to the fish tail fin 1 depending on the desired scope.

The invention claimed is:

1. A fishing lure, comprising:
a main body;
a trailing hook connected to the main body by a fishing line, and
a trailing body connected to the trailing hook,
wherein the trailing body has a first end directed towards the main body of the fishing lure when connected to the fishing lure, an opposite distal end, a longitudinal axis defined therebetween, an upper tail side and a lower tail side, said upper tail side and lower tail side diverging from each other towards the distal end, and the trailing body comprises two symmetrical body parts spaced apart from each other on opposite sides of the longitudinal axis and a hook support member interposed between the two body parts at the lower tail side, and
wherein the trailing body further comprises a floating member interposed between the two body parts along the longitudinal axis and either a) the trailing body, or b) the trailing body and the floating member together are configured to have a buoyancy greater than the total gravity force acting on the fishing lure, wherein the body parts each have a recess at the first end and the hook support member is arranged in the recess of each of the two body parts.

2. The fishing lure according to claim 1, wherein the trailing body has a general triangular shape and the distal end of the trailing body has a concave circular shape connecting said upper tail side and lower tail side.

3. The fishing lure according to claim 1, wherein the trailing body is made of flexible plastic material.

4. The fishing lure according to claim 1, wherein the floating member has a density of between 0.10-0.90 g/cm3.

5. The fishing lure of claim 1 wherein an open space is present between portions of the body parts.

6. The fishing lure of claim 1 wherein the recess of each body part defines part of the lower tail side.

7. The fishing lure according to claim 1, wherein the hook support member is configured to be connectable to the trailing hook.

8. The fishing lure according to claim 7, wherein the hook support member comprises a hollow tube-shaped member with a longitudinal slit, wherein the hollow tube-shaped member is configured to form a cavity into which the trailing hook can be snapped.

9. The fishing lure according to claim 8, wherein the hollow tube-shaped member is made of plastic.

10. A fishing lure, comprising:
a main body;
a trailing hook connected to the main body by a fishing line;
a trailing body connected to the trailing hook, the trailing body has a first end directed towards the main body of the fishing lure when connected to the fishing lure, an opposite distal end, a longitudinal axis defined therebetween, an upper tail side and a lower tail side, said upper tail side and lower tail side diverging from each other towards the distal end, and the trailing body comprises two symmetrical body parts spaced apart on opposite sides of the longitudinal axis and spaced from the longitudinal axis; and
a hook support member arranged along the longitudinal axis and adjacent to the lower tail side of the two body parts, the hook support member is hollow and has a longitudinal slit through which the trailing hook is insertable into the hook support member, wherein the body parts each have a recess at the first end and the hook support member is arranged in the recess of each of the two body parts.

11. The fishing lure of claim 10 wherein the body parts each have an inner surface facing inwardly toward the longitudinal axis and the inner surface of the body parts are parallel to each other.

12. The fishing lure of claim 11 which also comprises a floating member interposed between the inner surfaces of the two body parts, wherein the hook support member is located closer to the lower tail side than is the floating member.

13. The fishing lure of claim 12 wherein the inner surface of each body part is in contact with the floating member.

14. The fishing lure of claim 11 wherein the inner surface of each body part is flat and parallel to the longitudinal axis.

15. The fishing lure of claim 14 wherein each body part has an outer surface that is opposite to the inner surface and is flat and parallel to the longitudinal axis.

16. A fishing lure, comprising:
a main body;
a trailing hook connected to the main body by a fishing line;
a trailing body connected to the trailing hook, the trailing body has a first end directed towards the main body of the fishing lure when connected to the fishing lure, an opposite distal end, a longitudinal axis defined therebetween, an upper tail side and a lower tail side, said upper tail side and lower tail side diverging from each other towards the distal end, and the trailing body comprises two symmetrical body parts spaced apart on opposite sides of the longitudinal axis and spaced from the longitudinal axis with an open space provided between portions of the body parts;
a hook support member that is tubular, arranged along the longitudinal axis, and has a longitudinal slit through which the trailing hook is insertable into the hook support member; and
a floating member interposed between the two body parts and having a buoyancy that increases the buoyancy of the trailing body, wherein the body parts each have a recess at the first end and the hook support member is arranged in the recess of each of the two body parts.

17. The fishing lure of claim 16 wherein the body parts each have an inner surface that is in contact with the floating member, and that is flat and parallel to the longitudinal axis.

18. The fishing lure of claim 17 wherein each body part has an outer surface that is opposite to the inner surface and is flat and parallel to the longitudinal axis.

19. A fishing lure, comprising:
a main body;
a trailing hook connected to the main body by a fishing line, and
a trailing body connected to the trailing hook,
wherein the trailing body has a first end directed towards the main body of the fishing lure when connected to the fishing lure, an opposite distal end, a longitudinal axis defined therebetween, an upper tail side and a lower tail side, said upper tail side and lower tail side diverging from each other towards the distal end, and the trailing body comprises two symmetrical body parts spaced apart from each other on opposite sides of the longitudinal axis and a hook support member interposed between the two body parts at the lower tail side, and wherein the trailing body further comprises a floating member interposed between the two body parts along the longitudinal axis and either a) the trailing body, or b) the trailing body and the floating member together are configured to have a buoyancy greater than the total gravity force acting on the fishing lure, wherein the body parts each have an inner surface facing inwardly toward the longitudinal axis and the inner surface of the body parts are parallel to each other.

20. A fishing lure, comprising:
a main body;
a trailing hook connected to the main body by a fishing line;
a trailing body connected to the trailing hook, the trailing body has a first end directed towards the main body of the fishing lure when connected to the fishing lure, an opposite distal end, a longitudinal axis defined therebetween, an upper tail side and a lower tail side, said upper tail side and lower tail side diverging from each other towards the distal end, and the trailing body comprises two symmetrical body parts spaced apart on opposite sides of the longitudinal axis and spaced from the longitudinal axis; and
a hook support member arranged along the longitudinal axis and adjacent to the lower tail side of the two body parts, the hook support member is hollow and has a longitudinal slit through which the trailing hook is insertable into the hook support member, wherein the body parts each have an inner surface facing inwardly toward the longitudinal axis and the inner surface of the body parts are parallel to each other.

21. A fishing lure, comprising:
a main body;
a trailing hook connected to the main body by a fishing line;
a trailing body connected to the trailing hook, the trailing body has a first end directed towards the main body of the fishing lure when connected to the fishing lure, an opposite distal end, a longitudinal axis defined therebetween, an upper tail side and a lower tail side, said upper tail side and lower tail side diverging from each other towards the distal end, and the trailing body comprises two symmetrical body parts spaced apart on opposite sides of the longitudinal axis and spaced from the longitudinal axis with an open space provided between portions of the body parts;
a hook support member that is tubular, arranged along the longitudinal axis, and has a longitudinal slit through which the trailing hook is insertable into the hook support member; and
a floating member interposed between the two body parts and having a buoyancy that increases the buoyancy of the trailing body, wherein the body parts each have an inner surface facing inwardly toward the longitudinal axis and the inner surface of the body parts are parallel to each other.

* * * * *